Nov. 7, 1961 S. E. URBAN 3,007,208
METHODS OF APPLYING RESIN FOAM
Filed March 31, 1959 2 Sheets-Sheet 1

Inventor
Stephen E. Urban
By his Attorney
Benjamin C. Pollard

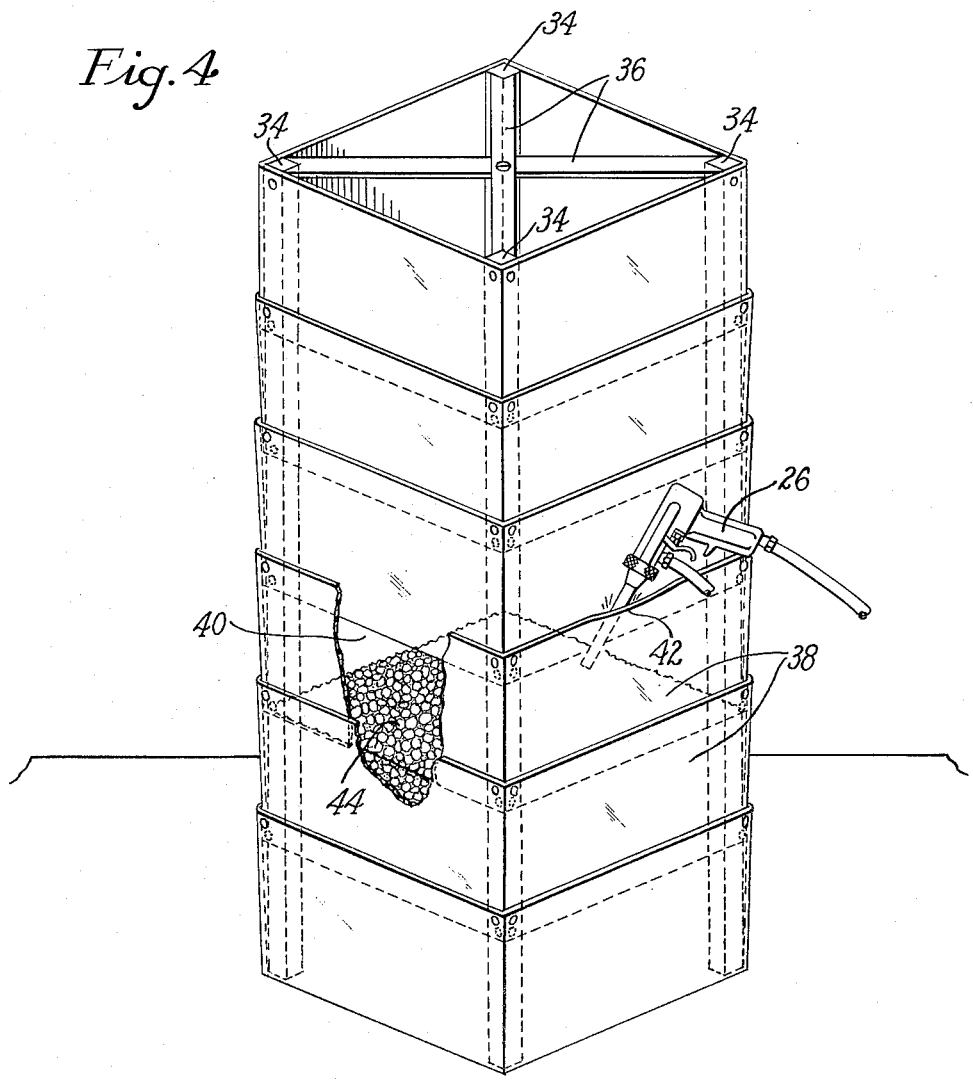

3,007,208
METHODS OF APPLYING RESIN FOAM
Stephen E. Urban, Melrose, Mass., assignor to B.B. Chemical Co., Boston, Mass., a corporation of Massachusetts
Filed Mar. 31, 1959, Ser. No. 803,122
10 Claims. (Cl. 18—59)

This invention relates to a method of molding cellular resinous material in a structure, and particularly to molding a means of flotation into the hull of a boat.

Foam plastics which have a closed-cell cellular structure have been used to provide marine flotation for safety purposes, and to form insulation for warm and cold containers. These foamed materials, such as polystyrene, have been used ordinarily as preformed blocks separately secured to surfaces, a method which makes it difficult to fit the foamed material in close over-all engagement with the contours of the structure. It has been proposed to form the foamed resin in situ to provide foam bodies which are self-adhesive and conform more faithfully to the structure's contours and thus provide a tighter lining.

Foaming-in-place on vertical or slanting walls has been carried out by spraying on a surface materials reactive to form a foam or by pouring a reactive mixture into existing hollow spaces in a structure. The former is done under pressure and has the disadvantage of skipping areas, leaving non-adhesive voids, spattering and running into pools. Pouring the liquid mixture in place is available as a method only where the structure contains voids and appropriate openings for introduction of foamable material.

It is an object of this invention to provide a simple method of casting liquid foamable resin in desired areas of a structure and causing it to expand to a desired thickness in a desired relation to said structure.

According to the present invention, a polyurethane foam layer is foamed in place in a foaming chamber defined at least in part by a tough, strong load supporting membrane formed of partially overlapping strips of flexible resilient film. The specific procedure employed will depend upon the situation and area in which the foam layer is to be formed.

In a preferred method particularly adapted for providing a layer of polyurethane foam on an upright or slanting surface, flexible barrier strips are secured in resiliently taut condition in spaced relationship to a selected surface, such as the hull of a boat, and in mutual overlapping relation to form with the surface a chamber for receiving and molding the resin foam. The joints between the overlapping strips are spread apart to allow the introduction of foamable polyurethane material and are brought together by the resilient tension on the strips after the material is introduced to seal the chamber. Foamable polyurethane resins are introduced through these joints at successive levels of the strips in quantities sufficient after expansion to fill the space between the surface and film with a strong, lightweight body firmly adhering to the surface.

When a foam is to be formed on a substantially horizontal surface, the reactive resin mixture may be simply poured on the surface using the overlapping flexible barrier strips secured to uprights to restrain lateral flow of the mixture as desired.

A self-standing body of the cellular material may also be formed by foaming the resin between walls which are formed by strips of the barrier film tautly stretched across upright spacers so positioned that the film strips enclose a chamber.

The barrier strips may be a tough, strong resinous material to which the polyurethane foam bonds permanently so that the barrier strip itself provides a tough integrally united load-supporting surface. Alternatively, flexible barrier strips may be used to which the polyurethane does not ahere. These strips may be removed after setting up of the resin.

Reference is made to the drawings forming part of the disclosure in which,

FIG. 4 is an angular view with parts broken away of a self-standing foam-filled chamber formed according to the method of the present invention.

The method is particularly well adapted to provide flotation in boats, and the invention will be described as it applies to this use. However, the method is of advantage in providing sound and heat insulation and structural reinforcement, not only in boats but also in airplanes, refrigerator cars or other vehicles, special contains, and in buildings.

Figure 1:
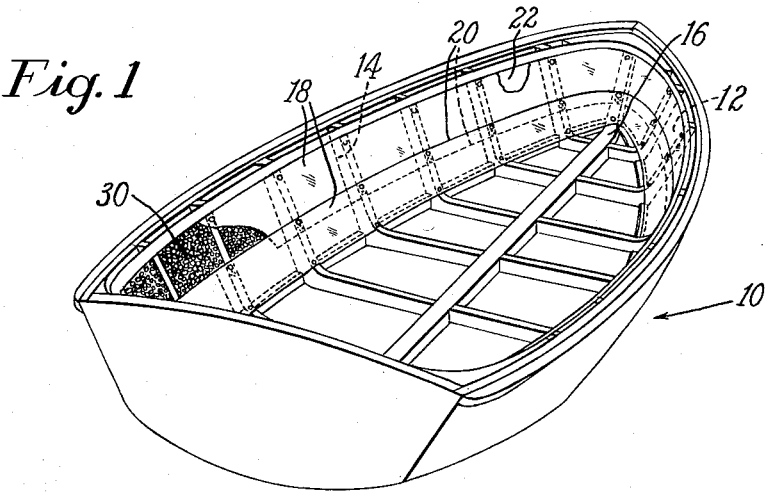
FIG. 1 is an angular top view of a boat hull in which a foam layer is formed according to the method of the present invention.

The boat shown in FIG. 1 comprises an outer hull 10 with inner wall surface 12 and exposed ribs 14 running parallel to each other down the sides of the hull 10 and transverse to the keel 16. The boat hull 10 itself may be wood, plastic, metal, glass-laminated or other material suitable for marine construction.

Figure 2:
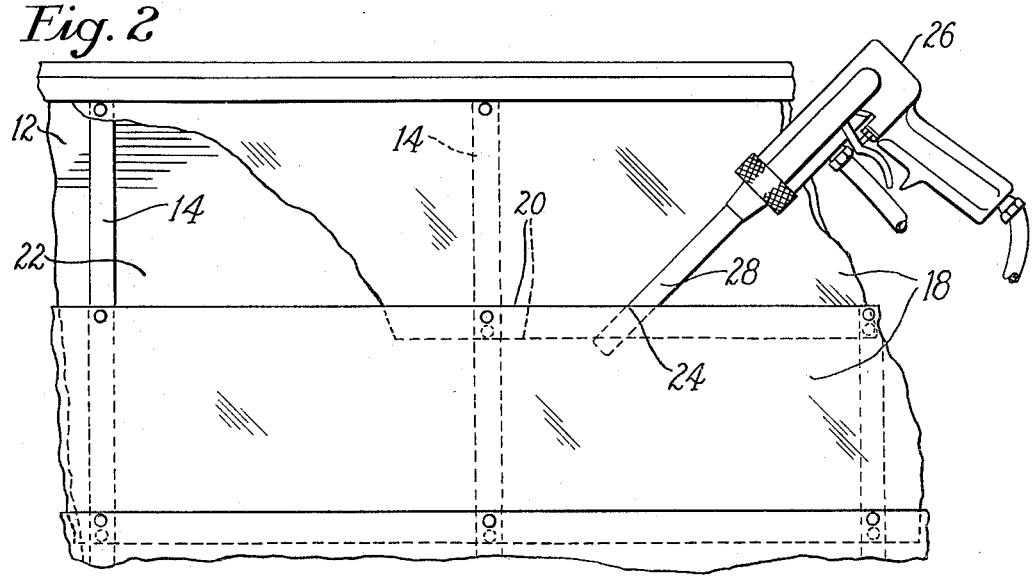
FIG. 2 is an elevational view on an enlarged scale of a portion of the hull with a section of the restraining film cut away to show the method of application of the resin in the present invention.

The ribs 14, exposed on the inner side of the hull 10, serve as spacer means for supporting barrier strips 18. The barrier strips 18, which may be of any convenient width, for example, about 20" wide, are disposed transverse to the ribs 14 and are secured to the ribs 14 in taut condition with the edges 20 in an overlapping relationship, as shown in FIG. 2. The strips 18 may overlap approximately one inch, the overlap normally being held together by the tension on the strips 18 to effect a liquid-tight joint. Thus, chambers or compartments 22 for casting the resin foam are formed between the inner surface 12 of the hull 10, the ribs 14, and the barrier strips 18.

The strips 18 must be of tough, somewhat elastic and preferably transparent material, such as polyethylene or polyester resin, e.g., Mylar, film so that the overlapping edges 20, which may be resiliently spread apart to form an opening 24 for introduction of the foamable resin mixture, will spring back together to seal the compartment 22 to the expanding resin. As shown in FIG. 2 the resin may be introduced by means of a device 26 which mixes the resin and discharges it from a maneuverable nozzle 28 projecting through the opening 24. The nozzle 28 may be moved around to insure complete wetting of the entire inner surface 12 of the boat hull.

A suitable resin mixing and discharge device 26 is disclosed in the copending application of Hans C. Paulsen, Serial No. 760,028, filed September 9, 1958, and entitled "Methods and Devices for Mixing and Dispensing Fluid Components" (this device is particularly adapted for mixing components to form polyurethane foam). The pistol-shaped structure more fully described in the above-noted application comprises a primary mixing chamber for a plurality of liquid components for subjecting these components to a plurality of air streams under pressure sufficient to effect partial intermixing of the components by turbulence, but insufficient to atomize the components. The air delivered to the primary mixing chamber conducts the partially intermixed components from the primary mixing chamber through an elongated secondary mixing chamber, and effects the completion of the intermixing within the secondary chamber.

Any suitable adhesive, natural or synthetic resin or rubber composition which expands to a cellular foam may be used. However, it is preferred to use material reactive to form relatively low density, between 2 to 3 lbs., polyurethane foams which are 90–98% closed-cell structure. Such foams have a high load-bearing capacity, are solvent resistant, do not deteriorate, are sound and heat insulators, and reinforce strongly. A closed-cell cellular buoyant foam is important for the construction of a non-sinkable boat.

Polyurethane foams may be formed from reaction products of a di- or polyisocyanate and materials having more than one active hydrogen atom. The preferred reactive compositions are mixtures of a prepolymer prepared by reaction of a di- or polyisocyanate and material having two or more active hydrogen atoms, such as a polyester, polyester amide, a glycol or an ether glycol, a gas forming material, and catalyst. The inclusion in the prepolymer of a volatile liquid, such as Freon, a dichlorodifluoro methane, as a foaming agent permits the more efficient cross linking of the —NCO groups of the prepolymer. Since water is omitted and there is no loss of —NCO through formation of carbon dioxide, a smaller, more economical quantity of the isocyanate is required. The fluorinated gas trapped in the foam produces a superior insulation material.

Useful isocyanate materials include toluene diisocyanate, metaphenylene diisocyanate, metatolylene dissocyanate, 3,3',-bitolylene 4,4' diisocyanate, paraphenylene diisocyanate, and 1 chloro 2,4 phenylene diisocyanate. For reaction with the isocyanate material, many materials having two or more active hydrogen atoms may be used. For example, as disclosed in the prior art, polyesters, polyesteramides, polyalkylene glycols, polyoxyalkylene glycols, and natural products, such as castor oil and its derivatives having reactive, preferably terminal, hydroxyl groups or carboxyl groups may be reacted with the di- or polyisocyanate. The di- or polyisocyanate is employed in an amount more than sufficient to provide —NCO groups for reaction with all the active hydrogen atoms and the partial reaction products or prepolymers will contain —NCO groups and, if desired, free polyisocyanate for subsequent gas forming and cross-linking reaction. In general, the mixture should be compounded to provide at least about 1.2 —NCO groups to each active hydrogen group and the preferred range is from 2:1 to 10:1. The partial reaction products are mixed with a cross-linking agent which may be water where blowing gas is to be generated from the isocyanate, and catalyst, such as organic, preferably tertiary, amines, or other alkaline materials. The mixtures are fluid compositions having desirable viscosity characteristics for processing and will foam at room temperature or above.

The polyurethane resin expands to fill the chamber 22 to the level of the inlet of the first barrier strip and press against the film 18 to form a foam body 30 without voids, the thickness of which is defined by the width of spacer means or ribs 14 exposed on the inner surface 12 of the hull 10. A further quantity of the reactive foam is introduced between the spread apart portions of the film at the next level above and deposited on the first foam body, and so on. As each level of resin expands it unites with the adjacent levels to form an integral foam mass. The expanded resin cures and hardens, adhering firmly to the surfaces of the hull and filling and sealing seams and cracks, thus preventing leakage.

Figure 3:
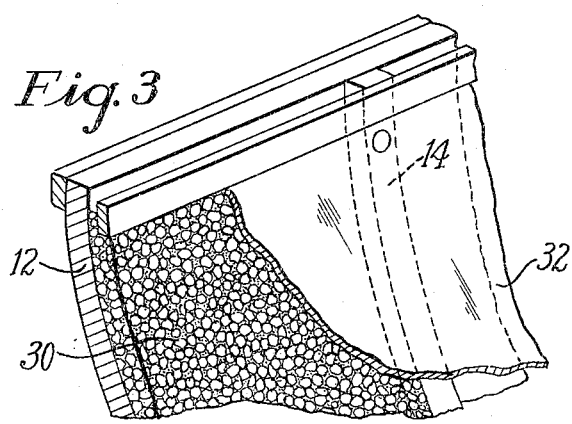
FIG. 3 is a view on an enlarged scale of a cross section of the hull with the finished foam layer and load-bearing finish.

A strippable barrier film, such as polyethylene, may be stripped off and the exposed surface of the foam resin then ground off level and a tough, waterproof, load-bearing finish 32 may be applied, see FIG. 3.

A non-strippable film, such as Mylar, a polyethylene terephthalate resin supplied by du Pont, will adhere to the foam as it cures at the interface. The slight overlap of the film may be further tightly sealed with a suitable adhesive to render the joint watertight. The Mylar film supplies a tough, flexible surface and is also decorative.

In another application of the invention, the barrier strips are used to constitute the entire wall of a self-standing foam-filled chamber independent of conventional preformed walls. As shown in FIG. 4, upright supports 34 are spaced to form an area of a desired outline and height and are joined by a cross bar 36, at one or both ends, to render the structure rigid. Barrier strips 38 of the resilient film tautly circumscribe the upright supports and are tacked in mutual overlapping relationship with their edge portions held together by the tension on the strips, as previously described. Successive levels of the strips cover the structure to a desired height, and provide sides to form a chamber 40. A foamable resin mixture is introduced by the resin mixing and discharge device 26 through a spread-apart portion 42 at each level, until the desired level is attained. The resin foams to fill the chamber defined by the wall or walls of barrier strips and to a height defined by the last level of introduction of the foamable mixture. After the foam 44 has cured, the cellular foam surface is treated in accordance with the nature of the film material used for the barrier strips. A non-strippable film, as Mylar, will be left to provide a tough outer skin. A strippable film, such as polyethylene, may be removed and the cellular surface finished as desired.

The upright support 34 may be of any rigid material, as wood, plastic, plywood or such, to which the barrier strips may be tautly secured. After the foam has cured, the crossbar at the end may be removed. The combination of upright supports and crossbar has the advantage that it may be arranged to form the particular outline desired, even to approximate a cylinder.

The above invention as it applies in providing a boat with flotation will now be set forth:

Example 1

The structure of a boat hull 10 was prepared to provide a clean, dry surface area for best adhesion of the resin. Strips of polyethylene film 18 were stretched tautly in overlapping relationship along the interior of the hull 10, with the edges 20 of the film strips secured at the ribs 14 of the hull.

80 parts by weight of an 80:20 mixture of the 2,4 and 2,6 isomers of tolylene diisocyanate were placed in a reaction vessel. To the tolylene diisocyanate there were added 20 parts of a liquid polyester resin having an OH number of 360, an acid number of 1, and a water content of 0.1%. The mixture was heated for one hour at 110° C. and formed a material referred to as a partial prepolymer having an —NCO to —OH ratio of 7.2:1.

91.8 parts by weight of the same polyester were mixed with 2 parts by weight of N-methyl morpholine (a catalyst), 5.4 parts by weight of water, and 0.8 part by weight of sorbitan monopalmitate (a surface active agent).

The partial prepolymer and the mixture of polyester, N-methyl morpholine and water were pumped into the mixing and dispensing device 26 at the aggregate rate of flow of 5 lbs. per minute. The mixed material was discharged through spread-apart portions 24 of the film into the compartments 22 as a milky material in the prefoaming stage. The end of the nozzle 28 was moved around to insure the complete coverage of all surface areas and partially to fill the compartment 22. After removal of the nozzle 28, the film 18 sprang back to seal the compartment 22 during the foaming process. The foam mixture was first introduced through an inlet 24 made by the spread-apart portion of the film 18 into the chamber 22 at the lowest level of the barrier strips. A quantity of resin was deposited to form foam up to a level approaching the level of the inlet 24. After the nozzle of the mixing device 26 was removed and the inlet was sealed by the tension on the film edge portions 20, the foam was allowed to expand into a cellular resinous mass. The foam mixture was similarly introduced through a corresponding inlet into the chamber at the next higher level. The resin in the chamber at the second level foamed to form a cellular resinous mass integrally joined to the first mass. The operation was continued until all the chambers contained between two ribs were filled by a continuous foam layer.

All sections of the hull are similarly treated. The expanded resin 30 was allowed to cure and harden and the polyethylene film 18 was stripped from the surface. The density of the foamed material was 2.3 lbs. The foam surface was ground off evenly and coated with a tough load-bearing waterproof surface finish 32.

*Example II*

The same procedure as in Example I was repeated substituting for the strippable barrier film 18 a nonstrippable polyethylene-terephthalate film, Mylar. This film adhered to the surface of the expanding resin as the polyurethane cured, to provide without further treatment the waterproof and tough, flexible film required. The slightly overlapped edges were united with an adhesive to make the joint water tight. The color of the interior finish of the boat was supplied by the selected color of the film.

*Example III*

Another foam resin layer was prepared, adding a liquid foaming agent to the prepolymer. In this case, 80 parts of an 80:20 mixture of the 2,4 and 2,6 isomers of tolylene diisocyanate, Hylene TM, were reacted with 20 parts of a liquid phthalic adipic polyester, Selectrofoam 6004, having a hydroxyl number of from 360 to 380. To 100 parts of this partial prepolymer mixture were added 35 parts of Freon-11, a dichlorodifluoro methane volatile liquid.

50 parts of the same polyester were mixed with 5 parts by weight of tetramethyl butanediamine, with 50 parts of a polyol, Atlas Polyether G-2410, derived from reacting sorbitol, which has six hydroxy groups, with propylene oxide, resulting in a hydroxyl number of 478, and with 0.5 part of water-soluble silicone, Linde X521.

The partial prepolymer, together with the Freon-11, and the mixture of polyester and the tetramethyl butanediamine catalyst were pumped into the dispensing device 26. The mixed material was dispensed as previously described in Example I, and the cured foam surface was similarly coated with the tough, flexible resin layer 32.

Having thus described my invention, what I claim as new and desire to secure by Letters Patent of the United States is:

1. The method of casting a body of cellular resinous material comprising the steps of providing spaced upright supports tautly securing barrier strips of a resilient film under tension to said supports at successively higher levels, the longitudinal edge portions of adjacent barrier strips being in mutually overlapping relationship and held together by the tension on said strips to form substantially liquid tight joints, said barrier strips constituting at least part of the upright walls of a chamber spreading apart overlapping edge portions defining a joint to form an inlet to said chamber, introducing a first quantity of liquid materials reactive to form polyurethane resin foam through said inlet into said chamber, said quantity being sufficient to form foam up to a level approaching the level of said inlet, bringing together said overlapping edge portions by the tension on said strips to close said inlet, causing said resin to foam partially to fill said chamber to form a first cellular resinous mass, thereafter spreading apart overlapping edge portions defining a joint at a level above the top of said first cellular resinous mass to form a second inlet, introducing a further quantity of said reactive materials through said second inlet and depositing it on said cellular resinous mass, bringing together said overlapping edge portions by the tension on said strips to close said second inlet and causing said resin to foam to form a further cellular resinous mass in said chamber integrally joined to said first cellular resinous mass.

2. The method of casting a body of cellular resinous material comprising the steps of providing spaced upright supports tautly securing barrier strips of a resilient transparent film under tension to said supports at successively higher levels, the longitudinal edge portions of adjacent barrier strips being in mutually overlapping relationship and held together by the tension on said strips to form substantially liquid tight joints, said barrier strips constituting at least part of the upright walls of a chamber, spreading apart overlapping edge portions defining a joint to form an inlet to said chamber, introducing a first quantity of liquid materials reactive to form polyurethane resin foam through said inlet into said chamber, said quantity being sufficient to form foam up to a level approaching the level of said inlet, bringing together said overlapping edge portions by the tension on said strips to close said inlet, causing said resin to foam partially to fill said chamber to form a first cellular resinous mass, thereafter spreading apart overlapping edge portions defining a joint at a level above the top of said first cellular resinous mass to form a second inlet, introducing a further quantity of said reactive materials through said second inlet and depositing it on said cellular resinous mass, bringing together said overlapping edge portions by the tension on said strips to close said second inlet and causing said resin to foam to form a further cellular resinous mass in said chamber integrally joined to said first cellular resinous mass.

3. The method of casting a body of cellular resinous material in adhering relation to a steeply sloped wall of a structure comprising the steps providing spacer means disposed against said wall, tautly securing barrier strips of a resilient film under tension to said spacer means at successively higher levels, said barrier strips being held by said spacer means in spaced relation to said wall, the longitudinal edge portions of adjacent barrier strips being in mutually overlapping relationship and held together by the tension on said strips to form substantially liquid tight joints, said barrier strips and said wall defining a chamber, spreading apart overlapping edge portions defining a joint to form an inlet to said chamber, introducing a first quantity of liquid materials reactive to form thermosetting resin foam through said inlet into said chamber, said quantity being sufficient to form foam up to a level approaching the level of said inlet, bringing together said overlapping edge portions by the tension on said strips to close said inlet, causing said resin to foam partially to fill said chamber to form a first cellular resinous mass adhering to said steeply sloped wall, thereafter spreading apart overlapping edge portions defining a joint at a level above the top of said first cellular resinous mass to form a second inlet, introducing a further quantity of said reactive materials through said second inlet and depositing it on said cellular resinous mass, bringing together said overlapping edge portions by the tension on said strips to close said second inlet and causing said resin to foam to form a further cellular resinous mass in said chamber integrally joined to said first cellular resinous mass and to said steeply sloped wall.

4. The method of casting a body of cellular resinous material in adhering relation to a steeply sloped wall of a structure comprising the steps of providing spacer means disposed against said wall, tautly securing barrier strips of a resilient film under tension to said spacer means at successively higher levels, said barrier strips being held by said spacer means in spaced relation to said wall, the longitudinal edge portions of adjacent barrier strips being in mutually overlapping relationship and held together by the tension on said strips to form substantially liquid tight joints, said barrier strips and said wall defining a chamber, spreading apart overlapping edge portions defining a joint to form an inlet to said chamber, introducing a first quantity of liquid materials reactive to form polyurethane resin foam through said inlet into said chamber, said quantity being sufficient to form foam up to a level approaching the level of said inlet, bringing together said overlapping edge portions by the tension on said strips to close said inlet, causing said resin to foam partially to fill said chamber to form a first cellular resinous mass adhering to said steeply sloped wall, thereafter spreading apart overlapping edge portions defining a joint at a level above the top of said first cellular resinous mass to form a second inlet, introducing a further quantity of said reactive materials through said second inlet and depositing it on said cellular resinous mass, bringing together said overlapping edge portions by the tension on said strips to close said second inlet and causing said resin to foam to form a further cellular resinous mass in said chamber integrally joined to said first cellular resinous mass and to said steeply sloped wall.

5. The method of casting a body of cellular resinous material in adhering relation to a steeply sloped wall of a structure comprising the steps of providing spacer means disposed against said wall, tautly securing barrier strips of a resilient transparent film under tension to said spacer means at successively higher levels, said barrier strips being held by said spacer means in spaced relation to said wall, the longitudinal edge portions of adjacent barrier strips being in mutually overlapping relationship and held togetther by the tension on said strips to form substantially liquid tight joints, said barrier strips and said wall defining a chamber, spreading apart overlapping edge portions defining a joint to form an inlet to said chamber, introducing a first quantity of liquid materials reactive to form polyurethane resin foam through said inlet into said chamber, said quantity being sufficient to form foam up to a level approaching the level of said inlet, bringing together said overlapping edge portions by the tension on said strips to close said inlet, causing said resin to foam partially to fill said chamber to form a first cellular resinous mass adhering to said steeply sloped wall, thereafter spreading apart overlapping edge portions defining a joint at a level above the top of said first cellular resinous mass to form a second inlet, introducing a further quantity of said reactive materials through said second inlet and depositing it on said cellular resinous mass, bringing together said overlapping edge portions by the tension on said strips to close said second inlet and causing said resin to foam to form a further cellular resinous mass in said chamber integrally joined to said first cellular resinous mass and to said steeply sloped wall.

6. The method of casting a body of cellular resinous material in adhering relation to a steeply sloped wall of a structure comprising the steps of providing spacer means disposed against said wall, tautly securing barrier strips of a resilient polyethylene film under tension to said spacer means at successively higher levels, said barrier strips being held by said spacer means in spaced relation to said wall, the longitudinal edge portions of adjacent barrier strips being in mutually overlapping relationship and held together by the tension on said strips to form substantially liquid tight joints, said barrier strips and said wall defining a chamber, spreading apart overlapping edge portions defining a joint to form an inlet to said chamber, introducing a first quantity of liquid materials reactive to form polyurethane resin foam through said inlet into said chamber, said quantity being sufficient to form foam up to a level approaching the level of said inlet, bringing together said overlapping edge portions by the tension on said strips to close said inlet, causing said resin to foam partially to fill said chamber to form a first cellular resinous mass adhering to said steeply sloped wall, thereafter spreading apart overlapping edge portions defining a joint at a level above the top of said first cellular resinous mass to form a second inlet, introducing a further quantity of said reactive materials through said second inlet and depositing it on said cellular resinous mass, bringing together said overlapping edge portions by the tension on said strips to close said second inlet and causing said resin to foam to form a further cellular resinous mass in said chamber integrally joined to said first cellular resinous mass and to said steeply sloped wall.

7. The method of casting a body of cellular resinous material in adhering relation to a steeply sloped wall of a structure comprising the steps of providing spacer means disposed against said wall, tautly securing barrier strips of a resilient polyethylene terephthalate film under tension to said spacer means at successively higher levels, said barrier strips being held by said spacer means in spaced relation to said wall, the longitudinal edge portions of adjacent barrier strips being in mutually overlapping relationship and held together by the tension on said strips to form substantially liquid tight joints, said barrier strips and said wall defining a chamber, spreading apart overlapping edge portions defining a joint to form an inlet to said chamber, introducing a first quantity of liquid materials reactive to form polyurethane resin foam through said inlet into said chamber, said quantity being sufficient to form foam up to a level approaching the level of said inlet, bringing together said overlapping edge portions by the tension on said strips to close said inlet, causing said resin to foam partially to fill said chamber to form a first cellular resinous mass adhering to said steeply sloped wall, thereafter spreading apart overlapping edge portions defining a joint at a level above the top of said first cellular resinous mass to form a second inlet, introducing a further quantity of said reactive materials through said second inlet and depositing it on said cellular resinous mass, bringing together said overlapping edge portions by the tension on said strips to close said second inlet and causing said resin to foam to form a further cellular resinous mass in said chamber integrally joined to said first cellular resinous mass and to said steeply sloped wall.

8. The method of casting a body of cellular resinous material in adhering relation to the hull of a boat to provide permanent safety flotation comprising the steps of providing ribs disposed substantially parallel to each other against said hull and transverse to the keel of said boat, tautly securing barrier strips of a resilient transparent film under tension to said ribs at successively higher levels, said barrier strips being held by said ribs in spaced relation to said hull, the longitudinal edge portions of adjacent barrier strips being in mutually overlapping relationship and held together by the tension on said strips to form substantially liquid tight joints, said barrier strips and said hull defining a chamber, spreading apart overlapping edge portions defining a joint to form an inlet to said chamber, introducing a first quantity of liquid materials reactive to form closed-cell polyurethane resin foam through said inlet into said chamber, said quantity being sufficient to form foam up to a level approaching the level of said inlet, bringing together said overlapping edge portions by the tension on said strips to close said inlet, causing said resin to foam partially to fill said chamber to form a first cellular resinous mass adhering to said hull, thereafter spreading apart overlapping edge portions defining a joint at a level above the top of said first cellular resinous mass to form a second inlet, introducing a further quantity of said reeactive materials through said second inlet and depositing it on said cellular resinous mass, bringing together said overlapping edge portions by the tension on said strips to close said second inlet and causing said resin to foam to form a further cellular resinous mass in said chamber integrally joined to said first cellular resinous mass and to said hull.

9. The method of casting a body of cellular resinous material to provide a substantially smooth exposed surface, comprising the steps of tautly securing barrier strips of a resilient film under tension to spaced supports, the longitudinal edge portions of said strips between said supports being in a mutually overlapping relationship and held together by the tension on said strips to form a substantially liquid-tight joint, said barrier strips constituting at least a part of the walls defining a substantially closed chamber, and said overlapping edge portions being capable of being spread apart to form an inlet to said chamber, spreading apart overlapping edge portions defining a joint to form an inlet to said chamber, introducing a liquid foamable composition through said inlet into said chamber in quantity to expand to a level above overlapping edge portions, bringing together said overlapping edge portions by the tension on said strips to close said inlet, and allowing said composition to foam and cure to form a cellular resinous body shaaped and confined by said walls and film barrier, said overlapping edge portions preventing escape of the liquid foaming composition and providing a substantially smooth surface against which portions of the cellular resinous body are cured.

10. The method of casting a body of cellular resinous material comprising the steps of providing spaced supports, tautly securing barrier strips of a resilient film under tension to said supports with longitudinal edge portions of adjacent barrier strips in mutually overlapping relationship and held together by the tension on said strips to form substantially liquid tight joints, said barrier strips constituting at least part of the walls of a chamber, spreading apart overlapping edge portions defining a joint to form an inlet to said chamber, introducing a first quantity of a liquid foamable resinous composition through said inlet into said chamber, said quantity being sufficient to form foam at least up to a level approaching the level of said inlet, bringing together said overlapping edge portions by the tension on said strips to close said inlet, causing said liquid to foam and expand into contact with said film barrier partially to fill said chamber to form a first cellular resinous mass, thereafter spreading apart overlapping edge portions defining a joint at a level above said first cellular resinous mass to form a second inlet, introducing a further quantity of said foamable liquid through said second inlet adjacent said cellular resinous mass, bringing together said overlapping edge portions by the tension on said strips to close said second inlet and causing said liquid to foam and expand into contact with said film to form a further cellular resinous mass in said chamber integrally joined to said first cellular resinous mass.

References Cited in the file of this patent
UNITED STATES PATENTS
2,877,503   Puderbaugh et al. _____ Mar. 17, 1959

UNITED STATES PATENT OFFICE
CERTIFICATE OF CORRECTION

Patent No. 3,007,208                      November 7, 1961

Stephen E. Urban

It is hereby certified that error appears in the above numbered patent requiring correction and that the said Letters Patent should read as corrected below.

Column 2, lines 25 and 26, for "contains" read -- container --; column 3, line 70, for "foam" read -- foamed --; column 4, line 29, for "support" read -- supports --; column 6, line 33, after "steps" insert -- of --; column 9, line 15, for "shaaped" read -- shaped --.

Signed and sealed this 17th day of April 1962.

(SEAL)
Attest:

ESTON G. JOHNSON                      DAVID L. LADD

Attesting Officer                      Commissioner of Patents